Patented Oct. 12, 1943

2,331,473

UNITED STATES PATENT OFFICE 2,331,473

CATALYTIC MATERIAL

Julius Hyman, Chicago, Ill., assignor to Velsicol Corporation, Chicago, Ill., a corporation of Illinois No Drawing. Application June 10, 1940, Serial No. 339,739

10 Claims. (Cl. 252—225)

This invention relates to new and unusually active, preferably synthetic, porous metallo-siliceous catalysts containing combined fluorine, which catalysts are amenable to repeated reactivation by calcining.

It has recently been asserted (U. S. Patent No. 2,154,527) that natural siliceous catalysts (such as bleaching earths) and active oxides (such as active alumina) show greatly enhanced catalytic ability in the hydrogenation of hydrocarbon oils if previously treated with fluorine or its compounds capable of corroding siliceous materials. From an examination of the specification it appears that the enhanced activity described in said invention results from the etching action of the fluorine-containing treating agent on the original catalyst. (See also U. S. Patent No. 2,194,186.)

The present invention is distinguished from the aforementioned in that (a) it may envisage as a starting material a homogeneous synthetic porous metallo-siliceous catalyst of predeterminable composition and variable density and structural characteristics; (b) a very appreciable percentage of combined fluorine is retained by the catalyst; and (c) the treatment is controlled so as to provide a catalyst which can be readily reactivated by calcining. I have found my catalysts to be vastly superior (measured, for example, by their ability to promote polymerization reactions of hydrocarbons) to such fluoride-treated catalysts as natural bleaching earths, silica gel and so-called activated oxides, such as activated alumina, when these latter were prepared in such a manner as recommended in the prior art.

As a starting material in the preparation of my catalysts, I prefer to use synthetic gels, produced by the interaction of sodium silicate with metallic salts. An ordinary type of such gel is the synthetic zeolite, commonly made by the interaction of aqueous solutions of sodium silicate with either aluminum sulphate or sodium aluminate. However, salts of other metals may be added to replace a part, or all of the aluminum. Examples of such metals are zinc, tin, beryllium, copper, manganese, titanium and zirconium. These metals are given as examples only, and I do not wish to be limited to their use solely. However, my experience has shown that the presence of alkali metals acts deleteriously on the catalyst, and this invention requires their absence to as great a degree as commercial water washing permits.

The chemical composition of finished gels will depend on the proportions of starting materials used. The density of the gels may be varied in numerous ways, including the method of adding to the gels substances which may be washed out after the gels have set sufficiently. Experience, furthermore, has shown that the pH of the solutions in which the gels are precipitated plays an important role in determining the final density of the gel; the lower the pH, the denser the resulting gel will tend to be. Experience with my catalysts indicates that, when the density of the gel is too high, the gel activity suffers. I would set as an upper limit for gel density a weight of 60 pounds per cubic foot of catalyst of 8 to 60 mesh in size, when packed by mild jogging until no appreciable further decrease in volume is detected. On the other hand, catalysts which are of too low a density generally lack physical strength and show a lower volume reactivity. For optimum operation and ease of recalcining, I recommend a density between 30 and 35 pounds per cubic foot on the aforementioned basis.

The raw gels formed from sodium silicate will, in general, contain a certain percentage of "zeolitic" or loosely-bound sodium, despite repeated washings. This sodium should preferably be removed before further treatment of the gel is instituted. I recommend as a ready means for accomplishing this the percolation with a solution of an ammonium salt, such as ammonium sulphate. In this way, ammonium is substituted for sodium, which latter is washed away from the gel.

Gels which have preferably been freed of alkali and alkali metal ion are then treated with a solution of ammonium fluoride. Ammonium bifluoride may also be used as a treating material, although the corrosive action of the bifluoride is disadvantageous, both from the standpoint of its effect on the gel and on the reaction vessel. Ammonium fluoride, which is non-corrosive, may be prepared from commercial ammonium bifluoride by adding to a solution of the latter sufficient ammonia to make it neutral to litmus. As soon as a solution of ammonium fluoride is added to the gel, ammonia is liberated, even in the cold. The ammonium fluoride treatment may be carried out at any desired temperature, preferably by batch treatment. Percolation treatment may also be used, but I find that the resulting catalyst is not as uniform as one prepared by batch.

However, the ratio of fluoride to gel is critical; if too little fluoride is used the effectiveness of the treatment is diminished, whereas if too much fluoride is employed the resulting catalyst will tend to sinter badly on reactivation by calcining, with the result that the effective life of the catalyst is greatly reduced. No hard and fast rule appears to apply in determining the quantity of fluoride required in treatment to obtain the most active catalysts, but experience has shown that such quantity generally lies between ¾ and 9 per cent of fluoride ion, based on the calcined weight of the unfluorinated catalyst; in fact, treatment with 1½ to 3 per cent of fluoride is usually found to coincide with maximum activity. Almost all of the fluoride ion used in the treatment is absorbed by the catalyst, and can be determined analytically. As will presently be pointed out, I have found that catalysts prepared in accordance with my invention lose a portion of the fluorine content upon recalcining. I have found that my catalyst retains its activity even when the percentage of fluorine content is 0.25 per cent. It will be understood, therefore, that the percentage limits heretofore set out refer to the optimum conditions for the making of my catalyst and I do not by those limits mean to imply that my catalyst will not be active when the fluorine content is less than 0.75 per cent.

It appears that the greater the percentage of combined metallic oxides, and the lower the (loosely-packed) density of the crude catalyst, the greater will be its fluoride requirements. However, a few exploratory experiments will suffice to determine the optimum fluoride treatment calculated to produce a catalyst of high activity, capable of reactivity by calcining.

My usual method is to use a water solution of ammonium bifluoride containing the predetermined quantity of fluoride, adding sufficient ammonium hydroxide to neutralize the solution, and heating the gel in said solution at about 200° F. for from four to six hours in batch treatment. Sufficient liquid is used to cover the gel completely, and water is added from time to time to compensate for the steam which is driven off. During the entire reaction the solution should remain either alkaline or neutral to litmus. After this treatment any excess fluoride is removed with water, until the wash water shows no appreciable precipitate with calcium chloride. The treatment may be interrupted at this point, and the catalyst dried and calcined. Experience has shown that an excess of fluoride will tend to combine with the catalyst on calcining, with resultant sintering and loss of catalytic activity.

Upon completion of liquid treatment, the gels must be mildly calcined, in order to liberate what appears to be chemically combined water and ammonia. This calcining is continued until no more ammonia is liberated by the gel. However, excess heating will liberate acidic vapors, and this should be avoided. In general, a calcining heat of 800° F. is sufficient to decompose the ammonium complex, and the calcining is discontinued when the vapors from the hot gel begin to turn moist blue litmus red.

I have found that gels prepared in this manner show practically no loss in weight over untreated gels, after taking into account the water and ammonia content of said original gels. Furthermore, the fluorine content of these treated gels is very appreciable, as previously mentioned. I have further found that each reactivation (by recalcining) of catalyst removes a certain amount of fluorine. For example, a catalyst which contained 1.5 per cent of fluorine originally showed only 0.25 per cent after three calcinings. With each ordinary recalcining there is lost from 0.3 to 0.4 per cent fluorine. If the recalcining is carried out too vigorously, this percentage will be increased, as the vapors which are given off from recalcining catalyst appear to carry off fluorine in acid form. Indications are, that the higher the ratio of metallic oxide to silica, the more resistant is the catalyst to loss in activity on repeated calcining. However, there appears to be no quantitative relationship between catalytic activity and fluorine content of my catalyst.

Catalysts prepared as herein described possess a very enhanced activity over untreated catalysts made with similar gels. This activity appears to be general for all reactions involving solid porous oxide type catalysts.

I find that fluoride treatment of silica gel and of activated oxides, such as activated alumina, is of little avail. Such treated gels and oxides show little enhanced activity over the untreated materials, and are very decidedly inferior as catalysts to fluorinated synthetic metallo-siliceous catalysts whose preparation has herein been described.

Among the uses which I contemplate for my catalysts are the reforming, polymerization, cracking, alkylation, hydrogenation, dehydrogenation, hydration, decolorization and desulphurization of hydrocarbons, both in liquid and vapor phase.

Porous catalysts during use gradually lose activity due, apparently, to the adsorption of poisoning substances. My catalyst may be reactivated by calcining at temperatures lying preferably between 800 and 1300° F. for periods of time generally varying from about 15 minutes to about two hours. There appears to be some reduction of activity with repeated calcining, tending finally to an activity roughly equivalent to that of the calcined, unfluorinated catalyst.

I claim as my invention:

1. The method of producing a catalytic material which comprises treating a synthetic siliceous zeolitic material with a derivative of ammonia and fluorine and calcining the treated material until the expelled vapors cease to be alkaline to litmus.

2. The method of producing a catalytic material which comprises treating a synthetic siliceous zeolitic material with a derivative of ammonia and fluorine and calcining the treated material at a temperature of approximately 800° F.

3. The method of producing a catalytic material which comprises treating a synthetic siliceous zeolitic material with a derivative of ammonia and fluorine and calcining the treated material at a temperature sufficient to decompose the ammonium complex.

4. The method of producing a catalytic material which comprises treating a synthetic siliceous zeolitic material with an aqueous solution of soluble fluoride salts and calcining the treated material.

5. The method of producing a catalytic material which comprises treating a synthetic siliceous zeolitic material with a derivative of ammonia and fluorine having a fluorine content of from ¾% to 9% by weight based on the weight of the zeolitic material, and calcining the treated material.

6. The method of producing a catalytic material which comprises treating a synthetic siliceous zeolitic material with a derivative of ammonia and fluorine having a fluorine content of from 1½% to 3% by weight based on the weight of the zeolitic material, and calcining the treated material.

7. A catalyst comprising a synthetic siliceous initially zeolitic material which has been treated with a derivative of ammonia and fluorine and calcined to destroy its zeolitic activity.

8. A catalyst comprising a synthetic siliceous initially zeolitic material containing from ¾% to 9% fluorine by weight.

9. A catalyst comprising a synthetic siliceous initially zeolitic material containing from 1½% to 3% fluorine by weight.

10. A catalyst comprising a synthetic siliceous initially zeolitic material containing fluorine.

JULIUS HYMAN.